(12) United States Patent
Simitsis et al.

(10) Patent No.: US 9,471,651 B2
(45) Date of Patent: *Oct. 18, 2016

(54) ADJUSTMENT OF MAP REDUCE EXECUTION

(71) Applicant: Hewlett-Packard Development Company, L.P., Houston, TX (US)

(72) Inventors: Alkiviadis Simitsis, Santa Clara, CA (US); William K. Wilkinson, San Mateo, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 498 days.

This patent is subject to a terminal disclaimer.

(21) Appl. No.: 13/646,945

(22) Filed: Oct. 8, 2012

(65) Prior Publication Data

US 2014/0101092 A1 Apr. 10, 2014

(51) Int. Cl.
*G06F 17/30* (2006.01)
*G06F 9/44* (2006.01)

(52) U.S. Cl.
CPC ....... *G06F 17/30563* (2013.01); *G06F 9/4443* (2013.01); *G06F 17/30398* (2013.01)

(58) Field of Classification Search
None
See application file for complete search history.

(56) References Cited

U.S. PATENT DOCUMENTS

| | | | |
|---|---|---|---|
| 6,820,262 B1 * | 11/2004 | Tellez et al. | 718/106 |
| 9,052,956 B2 * | 6/2015 | Simitsis | G06F 9/5038 |
| 2006/0059473 A1 * | 3/2006 | Moler | G06F 9/5072 |
| | | | 717/149 |
| 2008/0168082 A1 * | 7/2008 | Jin et al. | 707/102 |
| 2009/0055370 A1 * | 2/2009 | Dagum et al. | 707/4 |
| 2009/0296711 A1 * | 12/2009 | Kennedy | H04L 45/121 |
| | | | 370/392 |
| 2010/0083194 A1 | 4/2010 | Bagherjeiran et al. | |
| 2010/0114867 A1 * | 5/2010 | Olston | 707/713 |
| 2010/0241828 A1 | 9/2010 | Yu et al. | |
| 2011/0047172 A1 * | 2/2011 | Chen et al. | 707/764 |
| 2011/0276962 A1 | 11/2011 | Chambers et al. | |
| 2012/0005522 A1 * | 1/2012 | Kaminski | 714/4.11 |
| 2012/0054182 A1 * | 3/2012 | Gupta et al. | 707/737 |
| 2012/0089968 A1 | 4/2012 | Varadarajan et al. | |
| 2012/0144376 A1 | 6/2012 | Van Eijndhoven et al. | |
| 2012/0198466 A1 * | 8/2012 | Cherkasova et al. | 718/104 |
| 2013/0047161 A1 * | 2/2013 | Simitsis et al. | 718/100 |
| 2013/0191843 A1 * | 7/2013 | Sarkar et al. | 718/105 |
| 2013/0254196 A1 * | 9/2013 | Babu et al. | 707/736 |
| 2013/0339972 A1 * | 12/2013 | Zhang et al. | 718/104 |
| 2013/0346988 A1 * | 12/2013 | Bruno et al. | 718/102 |
| 2014/0019987 A1 * | 1/2014 | Verma et al. | 718/103 |
| 2014/0059552 A1 * | 2/2014 | Cunningham et al. | 718/102 |
| 2014/0075443 A1 * | 3/2014 | Tewes | G06F 9/4881 |
| | | | 718/102 |
| 2014/0089727 A1 * | 3/2014 | Cherkasova et al. | 714/6.13 |

OTHER PUBLICATIONS

Rainer Hauser and Jana Koehler, "Compiling Process Graphs into Executable Code," GPCE 2004, LNCS 3286, 2004, pp. 317-336, Springer-Verlag Berlin Heidelberg, Available at: <citeseerx.ist.psu.edu/viewdoc/summary?doi=10.1.1.89.7501>.

* cited by examiner

*Primary Examiner* — Richard Bowen
(74) *Attorney, Agent, or Firm* — Rathe Lindenbaum LLP

(57) ABSTRACT

Disclosed herein are techniques for adjusting a map reduce execution environment. It is determined whether some operations in a sequence of operations should be implemented in a map reduce execution environment. If it is determined that some operations in a sequence of operations should be implemented in a map reduce execution environment, the map reduce execution environment is adjusted to achieve a predefined performance objective.

16 Claims, 6 Drawing Sheets

|     | $e_1$ | $e_2$ | $e_3$ |
|-----|-------|-------|-------|
| $o_1$ | X | X |   |
| $o_2$ | ∞ | $c_1$ X | $c_2$ X |
| $o_3$ | X | X | X |
| $o_4$ | X | X |   |
| $o_5$ | X | X |   |
| f   | 0.8 | 1.0 | 0.4 |

*Fig. 5*

ADJUSTMENT OF MAP REDUCE EXECUTION

BACKGROUND

Many organizations maintain heterogeneous systems of information technology infrastructure comprising assorted data formats originating from multiple sources. For example, an organization may use a data warehouse to manage structured data and a map-reduce engine to manage semi-structured or unstructured data. Data warehouses may provide tools to extract, transform, and load data ("ETL tools"). Some ETL tools permit a user to specify operations that process data from multiple sources or to perform other functions. Such a tool may include a graphical user interface ("GUI") that displays a model of the entities and data sources involved in an ETL process.

BRIEF DESCRIPTION OF THE DRAWINGS

FIG. 5 is an example of an alternate data structure used for selecting execution environments in accordance with aspects of the present disclosure.

DETAILED DESCRIPTION

Figure 1:
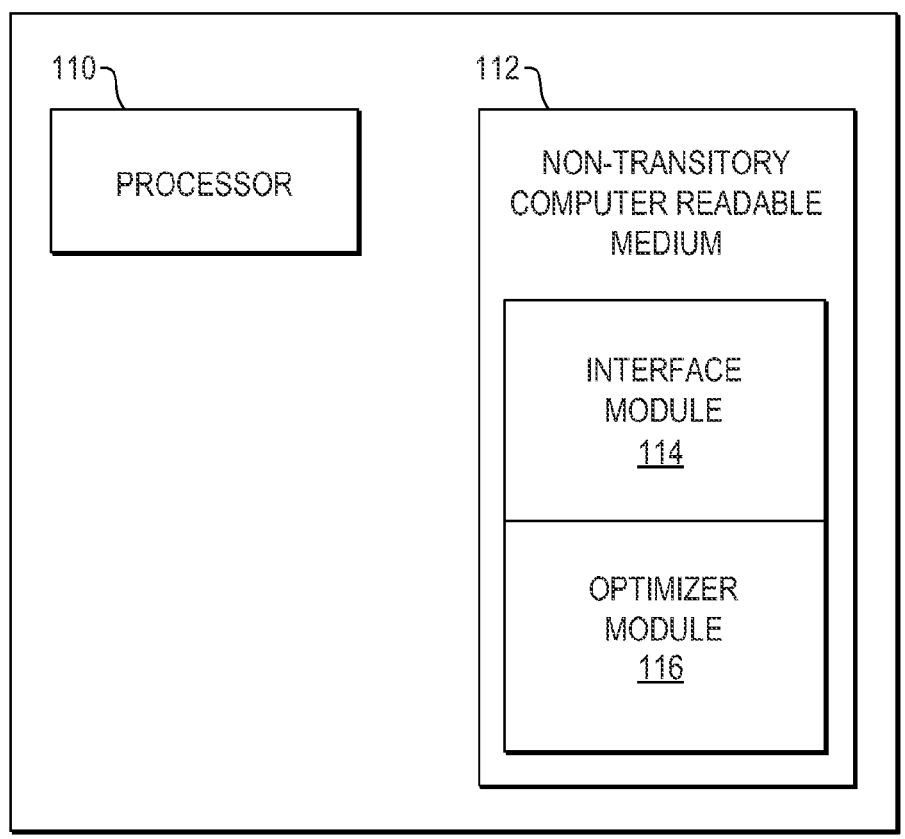
FIG. 1 is a block diagram of an example system in accordance with aspects of the present disclosure.

As noted above, ETL tools allow users to specify a sequence of operations that process data from various sources or that perform other types of functions. These tools may also convert user specified operations into executable code. As infrastructure and data become more diverse, an entire sequence of operations may not be suitable for execution in just one environment. While some operations may work well in any execution environment, other operations may be more appropriate for a particular environment. For example, in one operation, a map reduce cluster on a cloud network may be better suited for analyzing log files and, in a second operation, standard query language ("SQL") may be better suited for joining the results of the analyses with a data base table. In one example, map reduce may be defined as a programming model for processing very large data sets in parallel.

If a map reduce execution environment is more suitable for an operation in a process, the generated map reduce code may not account for the performance objectives of the process as a whole. While it is possible to generate efficient map reduce code, many aspects of map reduce execution are configurable via the map reduce execution environment. As such, operations that may benefit from a custom map reduce configuration may be bound to a default configuration. For example, if speed is a higher priority than fault tolerance, it may be beneficial to minimize the amount of data stored into back up storage while the map reduce operation executes. In another situation, speed may not be as critical as having a back up of intermediate output. In this instance, it may beneficial to increase the amount of data stored into back up storage.

In view of the foregoing, disclosed herein are a system, non-transitory computer readable medium, and method to adjust map reduce execution environments. In one example, It is determined whether some operations in a sequence of operations should be implemented in a map reduce execution environment. If it is determined that some operations in a sequence of operations should be implemented in a map reduce execution environment, the map reduce execution environment is adjusted to achieve a predefined performance objective.

The system, non-transitory computer readable medium, and method disclosed herein may configure the map reduce environment in view of the performance objectives of the sequence of operations, when some operations are selected for map reduce implementation. As such, rather than binding these map reduce operations to a default environment configuration, a configuration may be adjusted to be consistent with the performance objectives of the sequence. In one example, an execution environment may be defined as a context in which an operation is executed, such as an operating system, a database management system, a map reduce engine, or an operating system coupled with a hardware specification. The aspects, features and advantages of the present disclosure will be appreciated when considered with reference to the following description of examples and accompanying figures. The following description does not limit the application; rather, the scope of the disclosure is defined by the appended claims and equivalents.

FIG. 1 presents a schematic diagram of an illustrative computer apparatus 100 for executing the techniques disclosed herein. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network.

The computer apparatus 100 may also contain a processor 110, which may be any number of well known processors, such as processors from Intel® Corporation. In another example, processor 110 may be an application specific integrated circuit ("ASIC"). Non-transitory computer readable medium ("CRM") 112 may store instructions that may be retrieved and executed by processor 110. The instructions may include an interface module 114 and an optimizer module 116. In one example, non-transitory CRM 112 may be used by or in connection with any instruction execution system that can fetch or obtain the logic from non-transitory CRM 112 and execute the instructions contained therein.

Non-transitory CRM 112 may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. Alternatively, non-transitory CRM 112 may be a random access memory ("RAM") device or may be divided into multiple memory segments organized as dual in-line memory modules ("DIMMs"). The non-transitory CRM 112 may also include any combination of one or more of the foregoing and/or other devices as well. While only one processor and one non-transitory CRM are shown in FIG. 1, computer apparatus 100 may actually comprise additional processors and memories that may or may not be stored within the same physical housing or location.

The instructions residing in non-transitory CRM 112 may comprise any set of instructions to be executed directly (such as machine code) or indirectly (such as scripts) by processor 110. In this regard, the terms "instructions," "scripts," and "applications" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

As will be described in more detail below, the instructions in interface module 114 may cause processor 110 to display a GUI that permits a user to specify a sequence of operations and to request conversion thereof into executable code. Optimizer module 116 may convert each operation into code executable in an execution environment. In one example, selection of the execution environment may be at least partially based on resources consumed by each operation when executed therein. In one example, optimizer module 116 may determine that the sequence is more efficient in an order different than that specified by the user. Selection of the execution environment may be further based on the resources consumed when the sequence of operations is coordinated across different execution environments. If optimizer module 116 determines that some operations should be implemented in a map reduce execution environment, it may adjust the map reduce execution environment such that a predefined performance objective of the sequence of operations is achieved. The predefined performance objective may be configurable by the user via interface module 114.

Figure 2:
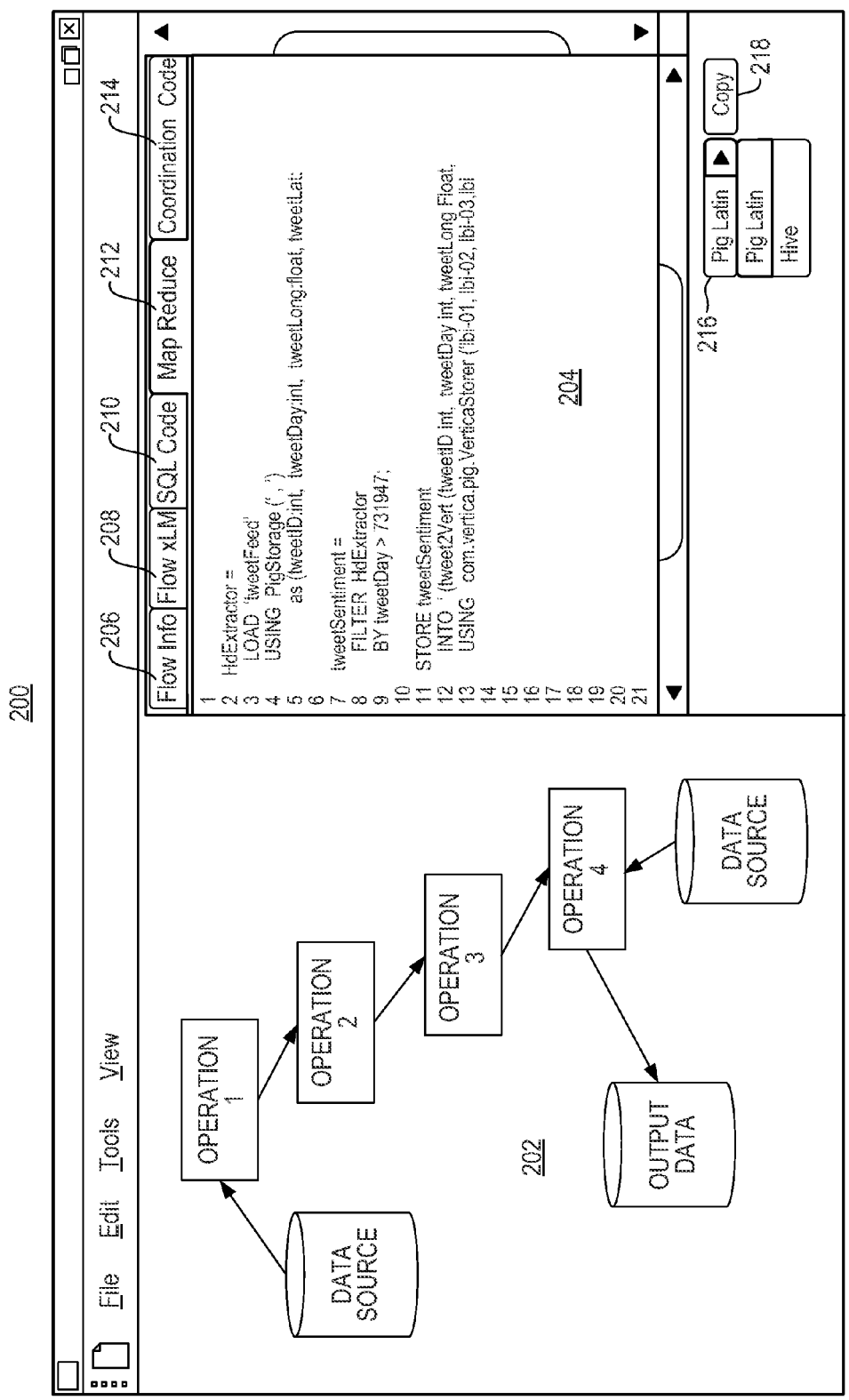
FIG. 2 is a working example of a graphical user interface in accordance with aspects of the present disclosure.

FIG. 2 illustrates an example GUI 200 that may be displayed in accordance with the instructions of interface module 114. The illustrative GUI 200 may have a left panel 202 in which a user may specify a sequence of operations by clicking and dragging icons representative of operations or data sources. In this example, left panel 202 displays four specified operations. Operation one and operation four are each shown having an external data input. Operations two thru four are each shown receiving input from a preceding operation. Operation four is also shown producing a final output of the sequence. The right panel 204 may display information associated with a tab positioned above the panel. In this example, right panel 204 is currently displaying information associated with map reduce tab 212. Upon clicking map reduce tab 212, right panel 204 may display map reduce code used to implement some operations in the process displayed in left panel 202. In this example, right panel 204 is displaying "Pig Latin" code, which is a known map reduce coding language. Drop down box 216 may allow a map reduce coding language to be configurable by a user. The example drop down box 216 shows an additional map reduce coding language called "hive." However, optimizer module 116 may preempt the user's coding language selection, if it determines that another coding language is more suitable given the performance objective. Once a user selects a map reduce coding language, the user may press the copy button 218 to copy the code to a clip board so as to allow the user to paste it into a file or a script.

A user clicking on flow information tab 206 may cause meta-data associated with the specified operations to be shown in right panel 204. A click on flow information tab 206 may also cause other information to be shown, such as a graph representation of the sequence of operations. A user clicking on xLM tab 208 may cause customized extensible markup language ("XML") code to be displayed in right panel 204. Such code may represent the sequence of operations specified in left panel 202. The "xLM" code may capture information regarding data structures used to implement the sequence of operations (e.g., nodes and edges of a graph or hierarchical tree of interlinked nodes). The "xLM" code may also capture design meta-data (e.g., functional and non-functional requirements or resource allocation). In another example, the "xLM" code may capture operational properties (e.g., operation type, data schema, operation statistics, parameters or expressions for implementing an operation type, or execution environment details). A user clicking on structured query language ("SQL") tab 210 may cause the display of SQL code in right panel 204. Such SQL code may be used to implement some operations in left panel 202 as determined by optimizer module 116. A user clicking coordination tab 214 may cause the display of executable code in right panel 204 that coordinates each operation in the process displayed in left panel 202. Once the execution environments are selected, GUI 200 may show tabs that permit a user to view or edit the generated code executable therein.

Figure 3:
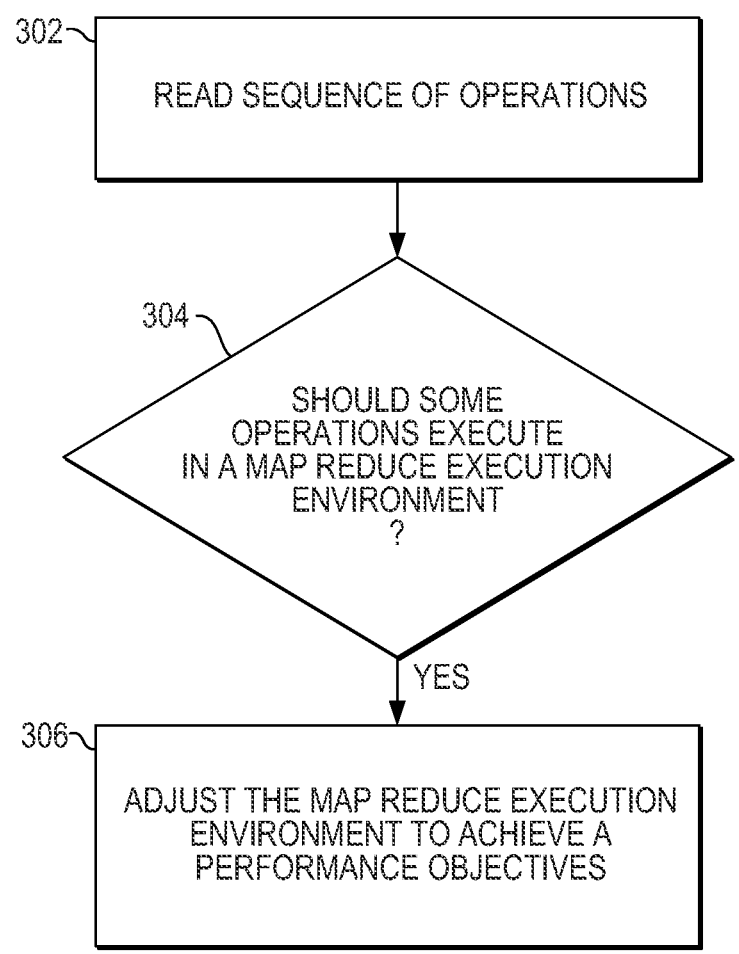
FIG. 3 is a flow diagram of an example method in accordance with aspects of the present disclosure.
Figure 4:
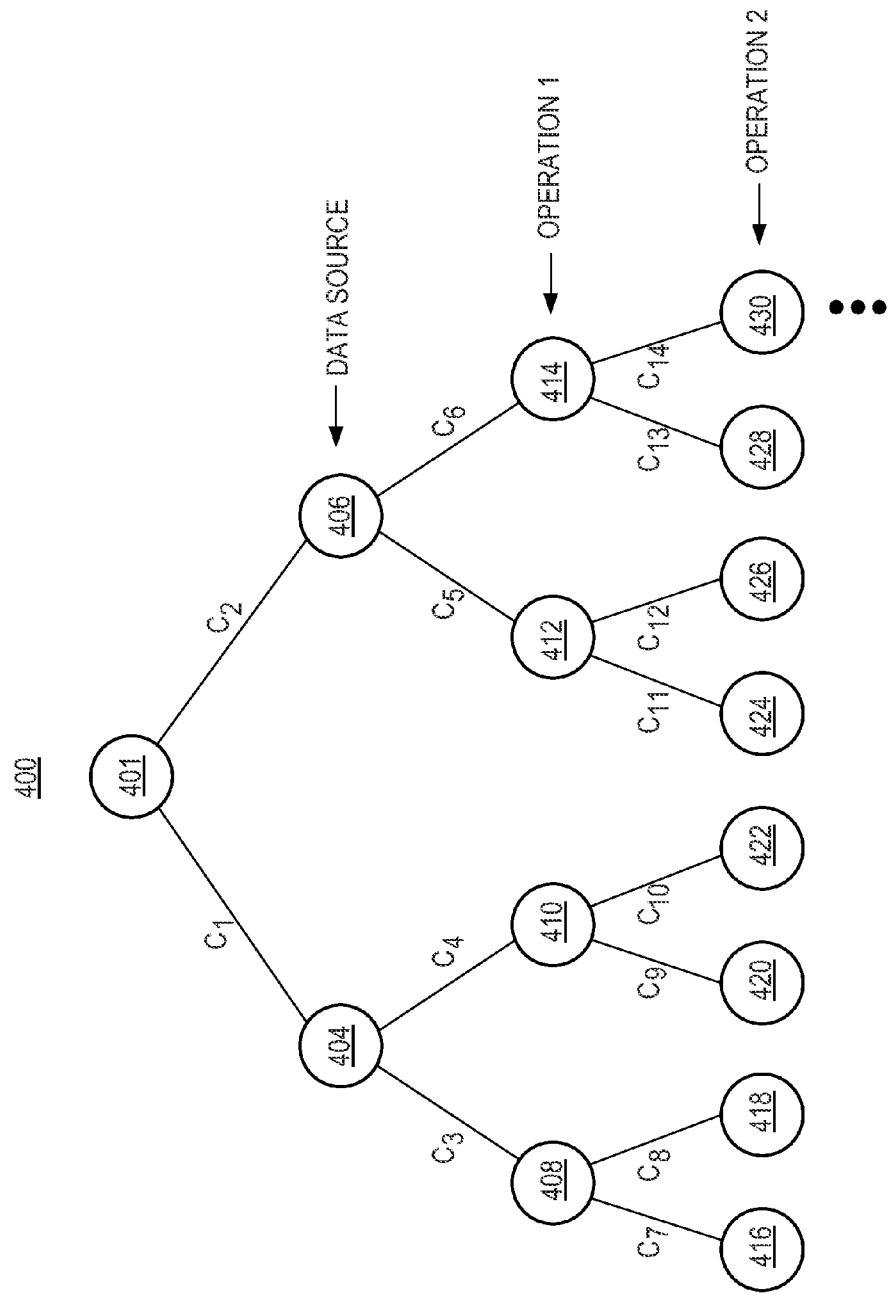
FIG. 4 is an example data structure used for selecting execution environments in accordance with aspects of the present disclosure.
Figure 5:
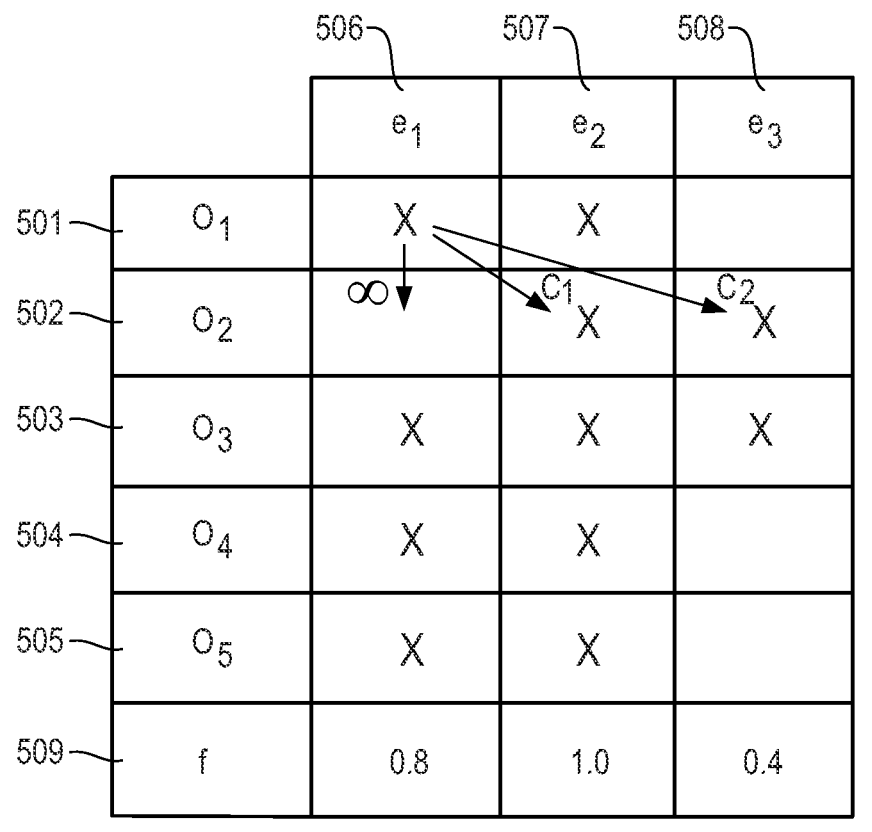

Working examples of the system, method, and non-transitory computer-readable medium are shown in FIGS. 3-5. In particular, FIG. 3 illustrates a flow diagram of an example method 300 for selecting and adjusting a map reduce execution environment. FIGS. 4-5 each show a different working example in accordance with the techniques disclosed herein.

As shown in block 302 of FIG. 3, a sequence of operations may be read. As noted above, the sequence of operations may be entered by a user via GUI 200. The user may also send a request to convert a sequence of user-specified operations into executable code. Selection of the execution environment may be based on a metric associated therewith. The metric may be partially based on resource consumption and/or resources consumed when the sequence of operations is coordinated across different execution environments. Such metrics may be stored as standing data that may be configured in advance by an administrator. Furthermore, such metrics may be derived by executing benchmark programs in each candidate execution environment.

Referring again to FIG. 3, it may be determined whether some operations in the sequence should be implemented in a map reduce execution environment, as shown in block 304. As noted above, such determination may be at least partially based on resource consumption and/or resources consumed when the sequence of operations is coordinated across different execution environments. One example of a map reduce execution environment is the Hadoop map reduce execution environment. As with the coding language, a user may also configure a type of map reduce execution environment using interface module 114. However, optimizer module 116 may preempt this configuration, if it determines that a different type is more suitable given the performance objective.

In block 306, if it is determined that some operations in the sequence should be implemented in a map reduce execution environment, the map reduce execution environment may be adjusted such that a predefined performance objective of the sequence is achieved. In one example, an amount of data stored in a backup repository during execution of an operation may be adjusted. Such an adjustment may be made by balancing speed requirements and fault tolerance requirements in accordance with the performance objective. In other examples, different configuration adjustments may be made, including, but not limited to: a number of map or reduce tasks to execute in parallel; a number of reducers per task; block size of a file system used by map reduce; map reduce job scheduler; buffer size for sorting or merging; number of parallel copy operations; java heap size; and, amount of nodes to use in a cluster of computers carrying out the map reduce operation. It is understood that the foregoing is a non-exhaustive list of possible configurations and that each type of map reduce execution environment may have many different types of configurable environment variables. The variables may be configured as, for example, command line parameters, a configuration file, or the like.

FIG. 4 shows an example hierarchical data structure of interlinked nodes that may be used to determine an execution environment for each operation. Root node 401 may represent the start of the process and each level in the hierarchical tree may be associated with an operation in the sequence or data processed by an operation in the sequence. A node in the tree may represent an execution environment that is a candidate for executing the operation corresponding to each level. Alternatively, a node in the tree may represent an execution environment into which a data source may be loaded. In the example of FIG. 4, the first level in the tree represents a data source. Each node in this first level (i.e., nodes 404 and 406) represents a candidate execution environment for storing the type of data corresponding to the first level. Each link associating a pair of nodes in the tree may represent a cost of transitioning between nodes (i.e., the cost of transitioning from one environment to another). As such, each link may represent a metric associated with each candidate execution environment. The link $C_1$ may represent the cost of loading the data into the execution environment represented by node 404 and C2 may represent the cost of loading the data into the execution environment represented by node 406. A path from the root node to a leaf node may represent a combination of execution environments that may be used to implement the sequence of operations.

The second level in the hierarchical tree of FIG. 4 may represent the first operation in the sequence. Nodes 408, 410, 412, and 414 are shown as candidate environments for executing this first operation. These second level nodes each have a cost metric associated therewith, namely $C_3$, $C_4$, $C_5$, and $C_6$ respectively. The second operation has eight candidate execution environments (i.e., 416-430) each associated with a cost $C_7$ thru $C_{14}$ respectively. In one example, optimizer module 116 may select the path of interlinked nodes from the root node to a leaf node whose total cost is consistent with the performance objective specified by the user. Therefore, the path may include different execution environments. However, the path may include the same execution environment if it is determined that using the same execution environment is consistent with the performance objective.

FIG. 5 shows an alternative representation that may be used to select an execution environment for each operation. In one example, the matrix data structure shown in FIG. 5 may be generated from a hierarchical tree of interlinked nodes after removing or "pruning" sections of the tree whose aggregate cost falls below or exceeds a predetermined threshold. In this example, each row 501-505 may represent an operation and each column 506-508 may represent a candidate execution environment. Each cell flagged with an "X" may indicate that the execution environment corresponding to the column thereof is a candidate for executing the operation corresponding to a given row. Each arrow projecting from the cell [$e_1$, $O_1$] may represent a cost of transitioning from an implementation of $O_1$ in execution environment $e_1$ to an implementation of $O_2$ in another execution environment. The cost of transitioning from [$e_1$, $O_1$] to [$e_1$, $O_2$] is shown as infinity, since $e_1$ is not a candidate for executing operation $O_2$. However $C_1$ may represent the cost of transitioning from [$e_1$, $O_1$] to [$e_2$, $O_2$] and $C_2$ may represent the cost of transitioning from [$e_1$, $O_1$] to [$e_3$, $O_2$].

Figure 6:
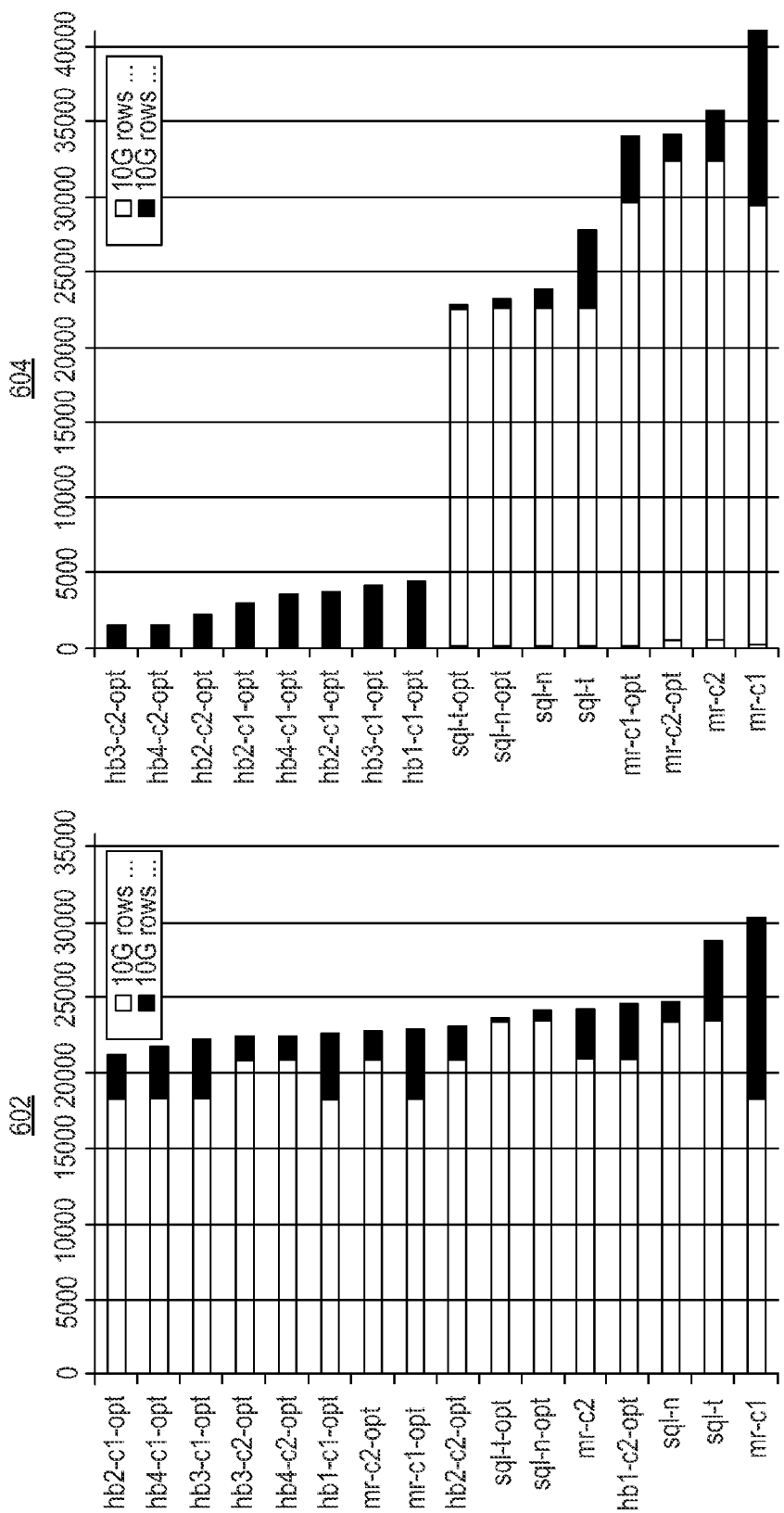
FIG. 6 is a bar graph illustrating the performance of various example execution environments.

FIG. 6 depicts two example graphs 602 and 604 that demonstrate the differences in execution times between various example execution environments. Execution environments prefixed with "mr" represent map reduce execution environments; the environments prefixed with "sql" represent SQL execution environments; and, the environments prefixed with "hb" represent a hybrid of different execution environments. These metrics may be used as standing data that may be configured in advance by an administrator. Each bar in graph 602 corresponds to an execution environment, and the length of each bar represents a total time in seconds of executing a sequence of operations on 10 gigabyte rows of data plus the time of loading the data, when executed in a corresponding execution environment. Thus, each bar in graph 602 assumes the data is stored outside the execution environment corresponding to each bar. The white portion of each bar in graph 602 represents the cost of loading the data and the black portion of each bar represents the cost of executing the operations. In graph 604, the length of each bar therein represents a total time in seconds of executing a sequence of operations on 10 gigabyte rows of data plus the time to forward any data to a subsequent execution environment, when the sequence is executed in an environment corresponding to each bar. Thus, each bar in graph 604 assumes the data is stored in a corresponding execution environment and accounts for data forwarded to a subsequent operation. The white portion of each bar in graph 602 represents the cost of forwarding the data and the black portion of each bar represents the cost of executing the operations.

Advantageously, the foregoing system, method, and non-transitory computer readable medium convert a process with different operations into code executable in different execution environments. If some of those operations are determined to be map reduce operations, the map reduce environment may be adjusted to ensure that the performance objective of the sequence is met. Instead of executing a map reduce operation using some default configuration, various configurations be used in view of the performance objectives. In this regard, the overall process may be optimized and end users of the resulting process may experience better performance.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system comprising:
   at least one processor;
   a non-transitory computer-readable medium comprising:
   an interface that causes the at least one processor to receive a sequence of operations specified by a user, the sequence of operations comprising a first operation and a second operation; and
   an optimizer that causes the at least one processor to:
   select, based upon a predefined performance objective of the sequence of operations, a first map reduce execution environment for the first operation and a second map reduce execution environment, different than the first map reduce execution environment, for the second operation;
   convert the first operation into code that is executable in the first map reduce execution environment; and
   convert the second operation into code that is executable in the second map reduce execution environment.

2. The system of claim 1, wherein the code converted from the first operation and the code converted from the second operation is presented to a user by the interface for modification by the user via the interface module.

3. The system of claim 1, wherein a type of the first map reduce execution environment is configurable by the user via the interface.

4. The system of claim 1, wherein the optimizer further causes the at least one processor to adjust an amount of data which the first map reduce execution environment stores in a backup repository during execution of the first operation.

5. The system of claim 1, wherein the selection of the first map reduce execution environment for the first operation and the selection of the second map reduce execution environment for the second operation are at least partially based on resource consumption.

6. The system of claim 1, wherein the selection of the first map reduce execution environment for the first operation and the selection of the second map reduce execution environment for the second operation is at least partially based on resources consumed when the sequence of operations is coordinated across the first map reduce execution environment and the second map reduce execution environment.

7. A non-transitory computer readable medium having instructions therein that cause at least one processor to:
   read a request to convert a sequence of operations, comprising a first operation and a second operation, into executable code;
   select, based upon a predefined performance objective of the sequence of operations, a first map reduce execution environment for the first operation and a second map reduce execution environment, different than the first map reduce execution environment, for the second operation;
   convert the first operation into code executable in the first map reduce execution environment; and reduce execution environment.

8. The non-transitory computer readable medium of claim 7, wherein the predefined performance objective is at least partially based on resources consumed by the first operation when implemented in the first map reduce execution environment.

9. The non-transitory computer readable medium of claim 7, wherein the predefined performance objective is at least partially based on resources consumed when the sequence of operations is coordinated across the first map reduce execution environment and the second map reduce execution environment.

10. The non-transitory computer readable medium of claim 7, wherein the instructions cause the at least one processor to present the code, converted from the first operation, to a user for modification by the user via an interface.

11. The non-transitory computer readable medium of claim 7, wherein a type of the first map reduce execution environment is configurable by a user.

12. The non-transitory computer readable medium of claim 7, wherein, the instructions stored therein further cause at least one processor to adjust an amount of data which the first map reduce execution environment stores in a backup storage during execution of the first operation.

13. A method comprising:
    displaying, using at least one processor, an interface that receives a series of operations associated with data and specified by a user;
    reading, using at least one processor, a request from the user via the interface to convert a sequence of operations into executable code;
    selecting, using at least one processor and based upon a predefined performance objective of the sequence of operations, a first map reduce execution environment for the first operation and a second map reduce execution environment, different than the first map reduce execution environment, for the second operation; and
    converting, using at least one processor, the first operation into code that is executable in the first map reduce execution environment and the second operation into code that is executable in the second map reduce execution environment.

14. The method of claim 13, wherein the selection of the first map reduce execution environment for the first operation and the selection of the second map reduce execution environment for the second operation are at least partially based on resources consumption.

15. The method of claim 13 further comprising:
    presenting present the code, converted from the first operation, to a user for modification by the user via an interface; and
    presenting present the code, converted from the second operation, to a user for modification by the user via an interface.

16. The method of claim 13, wherein a type of the first map reduce execution environment is configurable by the user via the interface.

* * * * *